United States Patent
Lin et al.

(10) Patent No.: US 10,726,174 B2
(45) Date of Patent: Jul. 28, 2020

(54) SYSTEM AND METHOD FOR SIMULATING RELIABILITY OF CIRCUIT DESIGN

(71) Applicant: TAIWAN SEMICONDUCTOR MANUFACTURING COMPANY LTD., Hsinchu (TW)

(72) Inventors: Chin-Shen Lin, Taipei (TW); Meng-Xiang Lee, Yunlin County (TW); Kuo-Nan Yang, Hsinchu (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 326 days.

(21) Appl. No.: 15/650,131

(22) Filed: Jul. 14, 2017

(65) Prior Publication Data
US 2019/0018920 A1    Jan. 17, 2019

(51) Int. Cl.
  *G06F 30/367*  (2020.01)
  *G06F 30/30*   (2020.01)
  *G01R 31/28*   (2006.01)
  *G06F 30/333*  (2020.01)
  *G06F 119/12*  (2020.01)

(52) U.S. Cl.
  CPC ......... *G06F 30/30* (2020.01); *G01R 31/2856* (2013.01); *G06F 30/367* (2020.01); *G01R 31/2848* (2013.01); *G06F 30/333* (2020.01); *G06F 2119/12* (2020.01)

(58) Field of Classification Search
  USPC .......................................................... 716/111
  See application file for complete search history.

(56) References Cited

U.S. PATENT DOCUMENTS

| | | | |
|---|---|---|---|
| 8,843,873 B1 * | 9/2014 | Sharma | G06F 17/5036 716/132 |
| 10,282,507 B2 * | 5/2019 | Saraswat | G06F 17/5045 |

* cited by examiner

*Primary Examiner* — Eric D Lee
(74) *Attorney, Agent, or Firm* — WPAT, P.C., Intellectual Property Attorneys; Anthony King

(57) ABSTRACT

A system for simulating reliability of a circuit design includes: a first memory device, arranged to store a technology file, wherein the circuit design comprises a plurality of circuit cells, and the first memory device further stores a plurality of first failure rates corresponding to a first circuit cell in the plurality of circuit cells; a first simulating device, coupled to the first memory device, for generating a first specific failure rate of the first circuit cell according to the plurality of first failure rates and the technology file; and an operating device, coupled to the first simulating device, for generating a total failure rate of the circuit design according to the first specific failure rate.

20 Claims, 6 Drawing Sheets

SYSTEM AND METHOD FOR SIMULATING RELIABILITY OF CIRCUIT DESIGN

BACKGROUND

An integrated circuit (IC) may contain millions of components. The components may include standard cells, metal lines, vias, and transistors. The reliability or stability of an IC is dependent on the stability of each component. Some applications, such as automotive or server, require relatively high reliability even after continuous working for a long time under extreme conditions, such as a high temperature environment. Therefore, the failure rate of an IC should be carefully evaluated.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
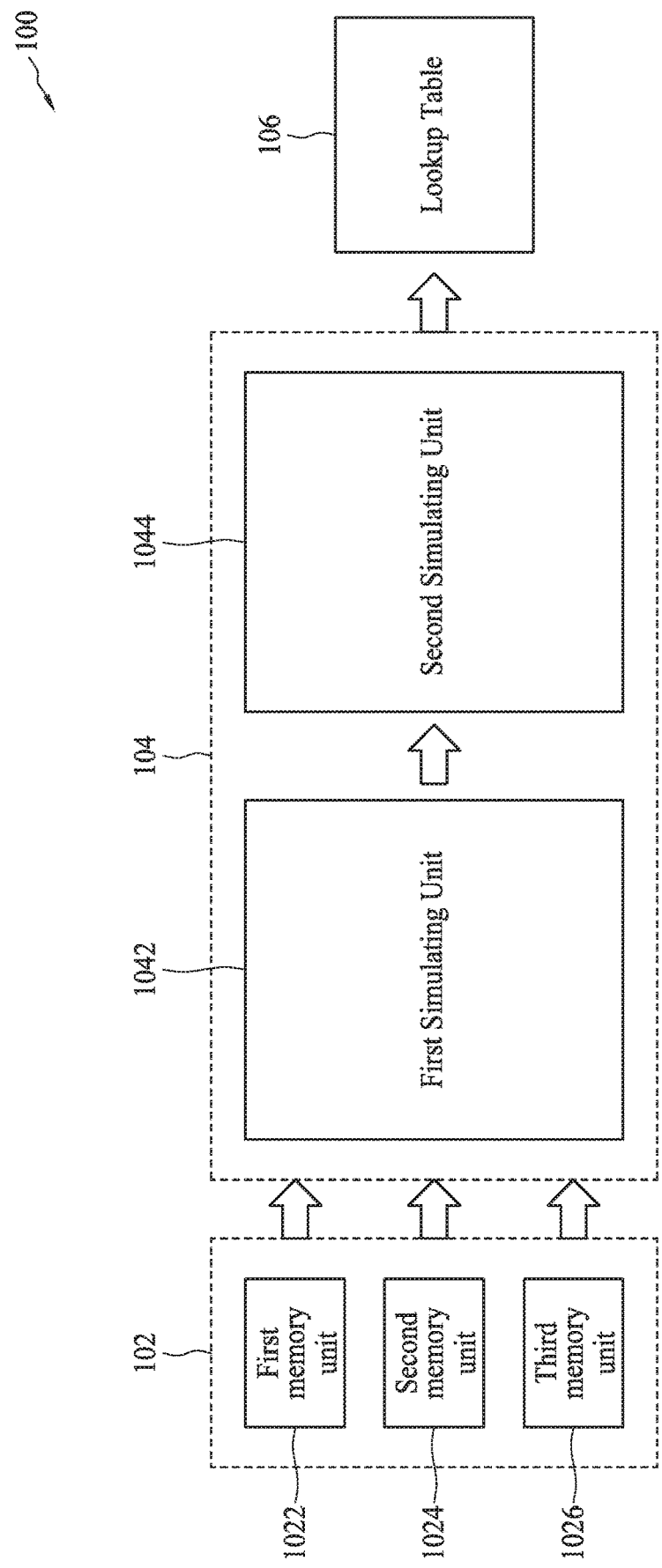
FIG. 1 is a block diagram of a system for simulating reliability of a circuit cell in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Failures in time (FIT) is usually used to represent the reliability of a chip, an integrated circuit (IC), or a circuit component. FIT is the unit for expressing an expected failure rate of semiconductors and other electronic devices. One FIT equals one failure per billion ($10^9$) device-hours and is statistically projected from the results of accelerated test procedures. For example, one FIT means one failure in 1000 products through $10^6$ hours or one failure in $10^5$ products through $10^4$ hours. In other words, the device hour $10^9$ can be divided into two factors, i.e. $10^x$ products and $10^y$ hours, wherein x+y=9. The FIT value of a circuit design is the sum of all FITs of components inside the circuit design. For example, the components may be standard cells, metal lines, via structures, and/or transistors (e.g. MOS or field-effect transistors).

FIG. 1 is a block diagram of a system 100 for simulating reliability of a circuit cell in accordance with some embodiments. The circuit cell may be a standard cell, a metal line, a via structure, and/or a transistor. Referring to FIG. 1, the system 100 comprises a memory device 102, a simulating device 104, and a lookup table 106. The memory device 102 comprises a first memory unit 1022, a second memory unit 1024, and a third memory unit 1026. The first memory unit 1022 is arranged to store a plurality of circuit cells (e.g. standard cell netlists). The second memory unit 1024 is arranged to store a plurality of output loading values $x\_1$~$x\_m$. The third memory unit 1026 is arranged to store a plurality of input slew values $y\_1$~$y\_n$. The simulating device 104 is coupled to the memory device 102 for simulating an electrical characteristic of a circuit cell from the plurality of circuit cells so as to generate a plurality of failure rates $z\_m\_n$ according to the plurality of output loading values $x\_1$~$x\_m$ and the plurality of input slew values $y\_1$~$y\_n$.

The lookup table 106 is arranged to record the plurality of failure rates $z\_m\_n$ with respect to the plurality of output loading values $x\_1$~$x\_m$ and the plurality of input slew values $y\_1$~$y\_n$. The output loading values $x\_1$~$x\_m$ may be a plurality of gradually increasing capacitances in pF (pico-Farad), and the input slew values $y\_1$~$y\_n$ may be a plurality of gradually increasing slew times in nS (nano-Second). A slew time is the time taken by a signal to change from a first voltage level (e.g. the high voltage level or the low voltage level) to a second voltage level (e.g. the low voltage level or the high voltage level). According to some embodiments, a slew time may also be replaced with a slew rate. In electronics, a slew rate is defined as the change of voltage per unit of time. According to some embodiments, the lookup table 106 may be stored in the memory device 102.

According to some embodiments, the electrical characteristic may be an electron-migration (EM) characteristic, a time-dependent dielectric breakdown (TDDB) characteristic, or a hot carrier injection (HCI) characteristic of the circuit cell.

According to some embodiments, the simulating device 104 comprises a first simulating unit 1042 and a second simulating unit 1044. The first simulating unit 1042 is arranged to perform the SPICE (Simulation Program with Integrated Circuit Emphasis) simulation upon the circuit cell with all possible states. SPICE is a general-purpose and open source analog electronic circuit simulator. It is a program used in integrated circuit and board-level design to check the integrity of circuit designs and to predict circuit behavior. The first simulating unit 1042 may perform the SPICE simulation upon the selected circuit cell by inputting the combination of one output loading value and one input slew value selected from the memory units 1024 and 1026. The first simulating unit 1042 may simulate the selected circuit cell by all the possible combinations of the output loading, values $x\_1\sim x\_m$ and the input slew values $y\_1\sim y\_n$. When all the possible combinations of the output loading values $x\_1\sim x\_m$ and the input slew values $y\_1\sim y\_n$ are simulated by the first simulating unit 1042, the first simulating unit 1042 may obtain the circuit behaviors of selected circuit cell corresponding to the all combinations of output loading values and input slew values respectively. When the SPICE simulation of the first selected circuit cell is done, the first simulating unit 1042 continuously performs the SPICE simulation upon the next circuit cell in the first memory unit 1022 until all of the circuit cells are simulated.

Figure 2:
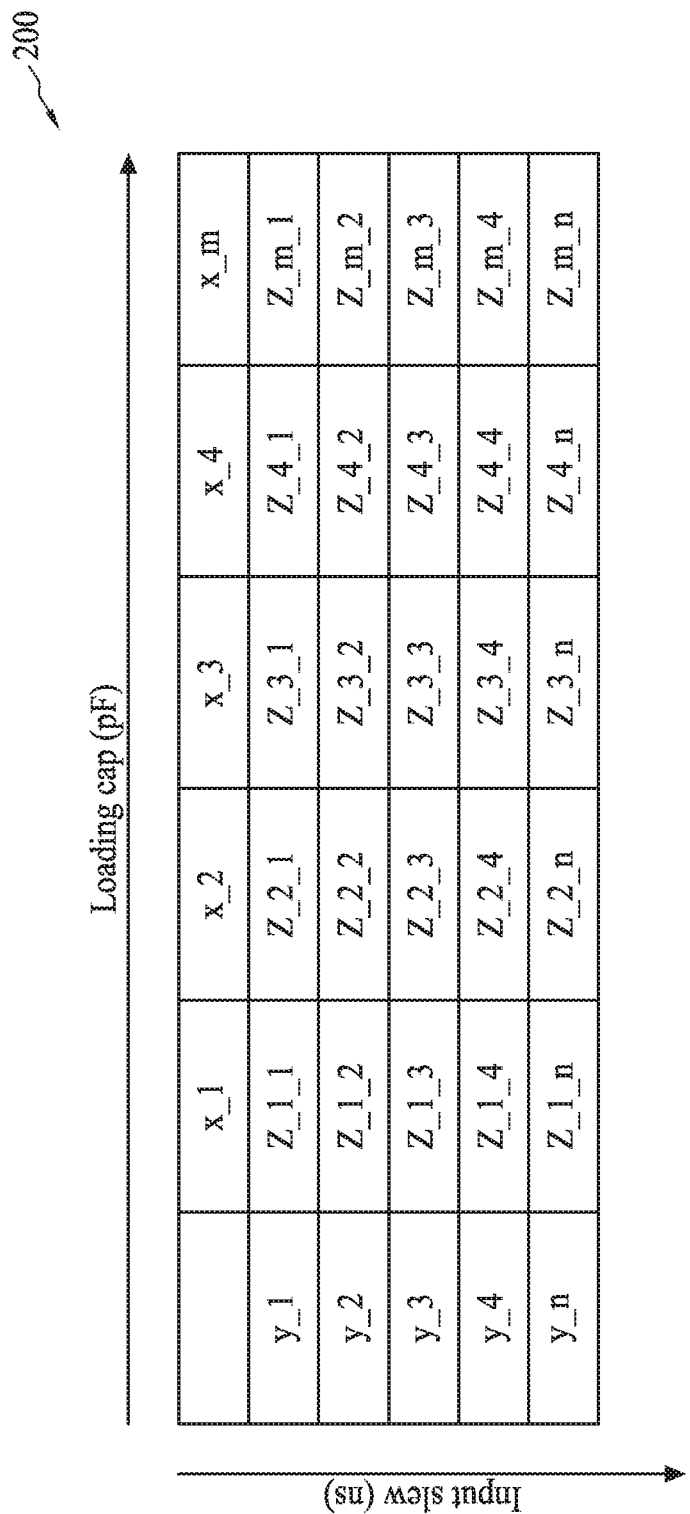
FIG. 2 is a diagram illustrating a lookup table in accordance with some embodiments.

The second simulating unit 1044 is arranged to perform the EM analysis (for example) upon the circuit cell to get total failure rate (e.g. FIT) for all states, i.e. all of the combinations of output loading values and input slew values. During the EM analysis, the second simulating unit 1044 may calculate the values of failure rate of the selected circuit cell corresponding to all of the combinations of output loading values and input slew values, and write the values into the lookup table 106. FIG. 2 is a diagram illustrating the lookup table 106 in accordance with some embodiments. The output loading values $x\_1\sim x\_m$ are the columns and the input slew values $y\_1\sim y\_n$ are the rows of the lookup table 200. The second simulating unit 1044 writes the failure rates $z\_m\_n$ with respect to the output loading values $x\_1\sim x\_m$ and the input slew values $y\_1\sim y\_n$ into the corresponding locations of the lookup table 106. For example, the second simulating unit 1044 uses the first output loading value $x\_1$ and the first input slew value $y\_1$ to perform the EM analysis upon the circuit cell for calculating the failure rate $z\_1\_1$. Then, the second simulating unit 1044 records the failure rate $z\_1\_1$ into the corresponding locations of the lookup table 106. The second simulating unit 1044 performs the EM analysis upon the circuit cell until all of the failure rates are calculated. When the EM analysis of the first selected circuit cell is done, the second simulating unit 1044 continuously performs the EM analysis upon the next circuit cell in the first memory unit 1022 to generate the corresponding lockup table until all of the circuit cells are analyzed. Accordingly, a plurality of lockup tables recording the failure rates of the circuit cells in the first memory unit 1022 is obtained. The plurality of lockup tables may be stored in the memory device 102.

It is noted that, instead of one-by-one performing the EM analysis upon all of the circuit cells in the first memory unit 1022, the second simulating unit 1044 may simultaneously perform the EM analysis upon all of the circuit cells in the first memory unit 1022.

Figure 3:
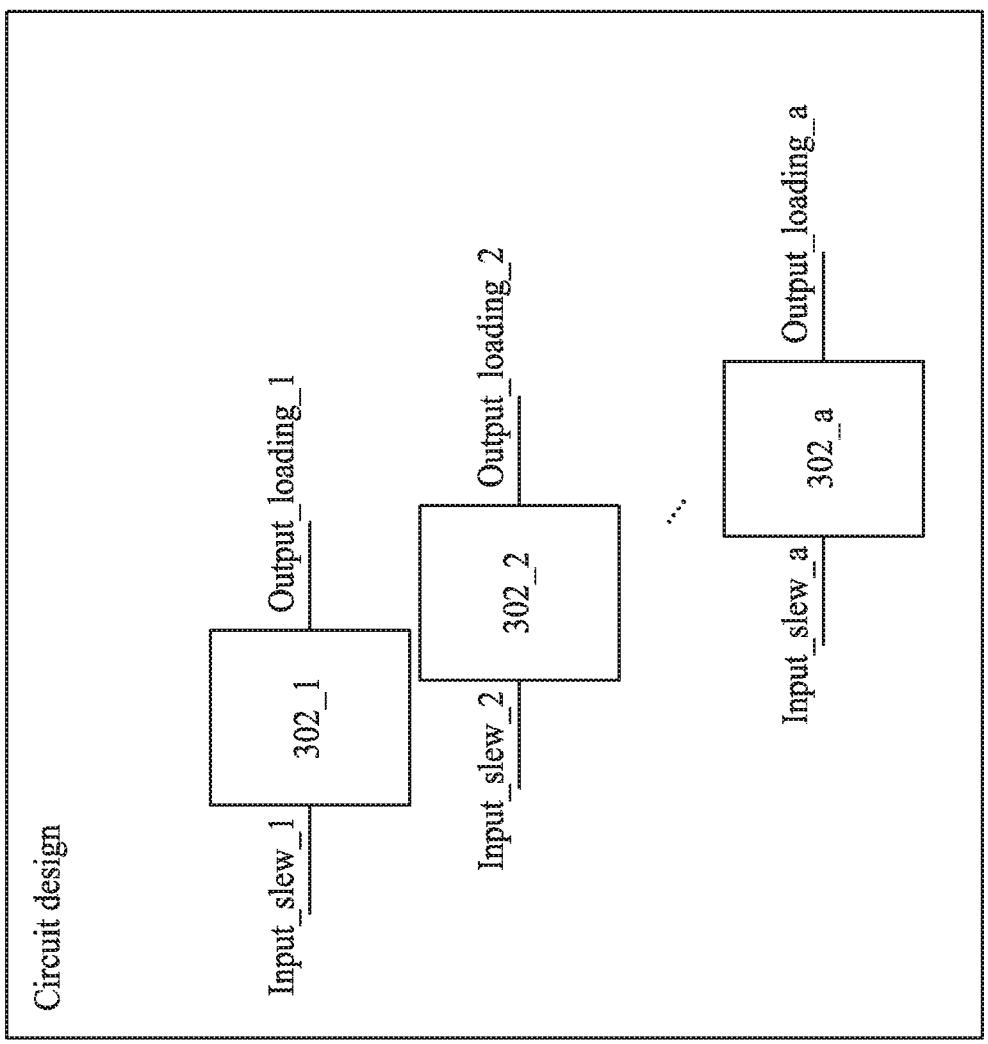
FIG. 3 is a diagram illustrating a circuit design in accordance with some embodiments.

FIG. 3 is a diagram illustrating a circuit design 300 in accordance with some embodiments. The circuit design 300 comprises a plurality of circuit cells 302_1~302_a. The circuit cells 302_1~302_a may be standard circuit cell. The circuit design 300 may further comprise a plurality of metal lines, a plurality of via structures, and/or a plurality of transistors. For brevity, the connectivity among the circuit cells 302_1~302_a is omitted for brevity. Each of the circuit cells 302_1~302_a may be characterized by a plurality of input slew values and a plurality of output loading values. According to some embodiments, each of the circuit cells 302_1~302_a is simulated with a plurality of input slew values and a plurality of output loading values to obtain a plurality of failure rates accordingly.

Figure 4:
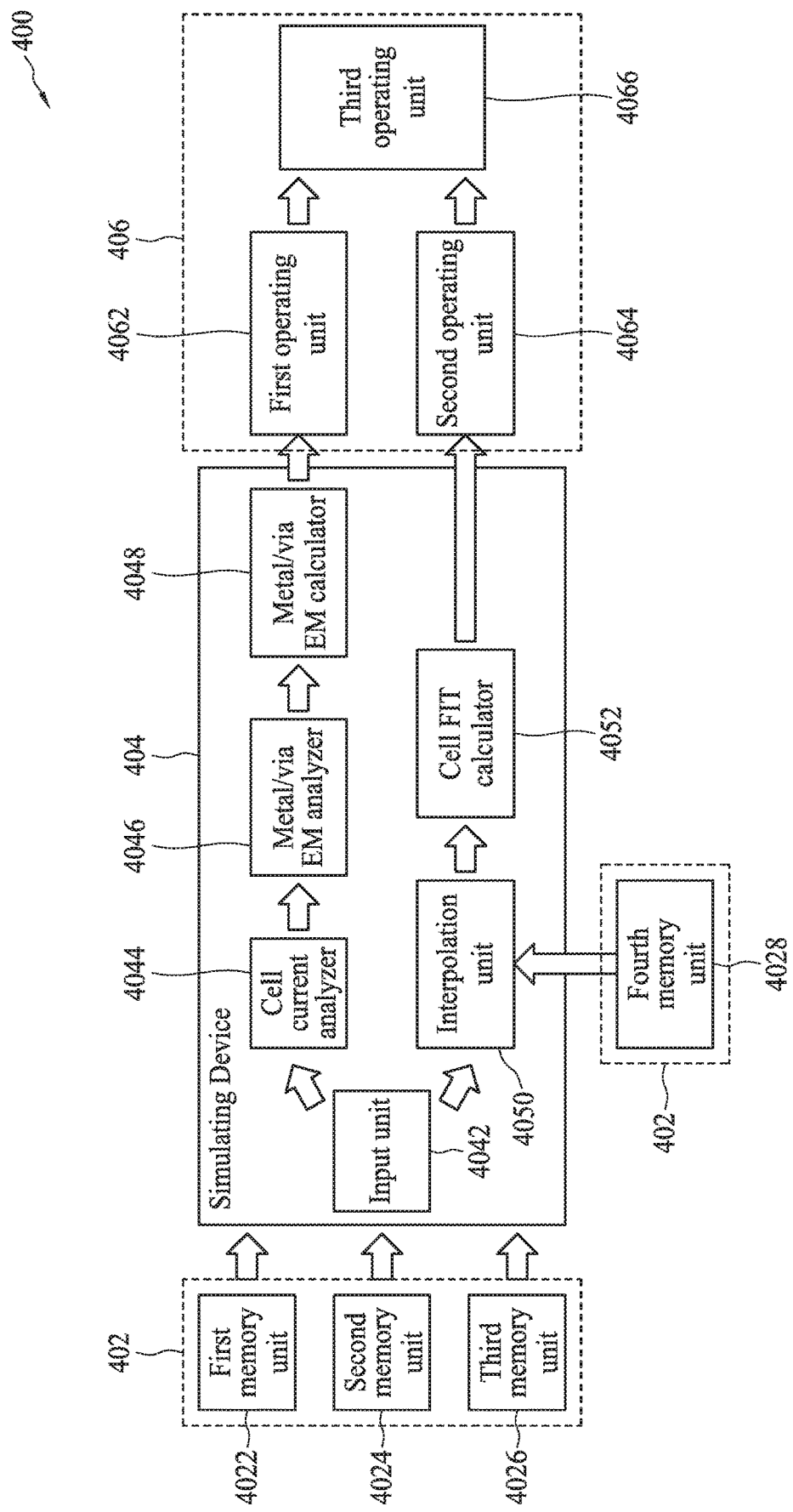
FIG. 4 is a diagram illustrating a system for simulating reliability of a circuit design of FIG. 3 in accordance with some embodiments.

FIG. 4 is a diagram illustrating a system 400 for simulating reliability of the circuit design 300 in accordance with some embodiments. The system 400 comprises a memory device 402, a simulating device 404, and an operating device 406. The memory device 402 comprises a first memory unit 4022, a second memory unit 4024, a third memory unit 4026, and a fourth memory unit 4028. The first memory unit 4022 is arranged to store a Design Exchange Format (DEF) file. The second memory unit 4024 is arranged to store a standard cell library (.lib). The third memory unit 4026 is arranged to store an EM technology file. The fourth memory unit 4028 is arranged to store a plurality of lookup tables. The lookup tables record a plurality EM failure rates (e.g. FIT) of all standard circuit cells 302_1~302_a in the circuit design 300 respectively. For a standard circuit cell, each EM failure rate corresponds to an output loading value and an input slew value as described in FIG. 2.

The simulating device 404 is coupled to the memory device 402. The simulating device 404 may include an Electronic Design Automation (EDA) tool for simulating the circuit design. According to some embodiments, the simulating device 404 is arranged to calculate the failure rates (e.g. FITs) of all components in the circuit design. The simulating device 404 comprises an input unit 4042, a cell current analyzer 4044, a metal/via EM analyzer 4046, a metal/via FIT calculator 4048, an interpolation unit 4050, and a cell FIT calculator 4052. During the operation of the simulating device 404, the input unit 4042 is arranged to load an input slew value and an output loading value of the circuit design 300 from the EM technology file in the memory unit 4026. The cell current analyzer 4044 is arranged to analyze the current characteristic of the circuit cells 302_1~302_a in the circuit design 300 according to the input slew value and the output loading value. The metal/via EM analyzer 4046 is arranged to perform EM analysis upon the metal lines and via structures in the circuit design 300. The metal/via FIT calculator 4048 is arranged to calculate failure rates (e.g. FIT) of the metal lines and via structures in the circuit design 300 corresponding to the input slew value and the output loading value.

In addition, the interpolation unit 4050 receives the input slew value and the output loading value from the input unit 4042. For a first circuit cell (e.g. 302_1) in the circuit design 300, the interpolation unit 4050 checks if a lookup table in the memory unit 4028 corresponding to the first circuit cell records the specific failure rate corresponding to the input slew value and the output loading value. If the lookup table corresponding to the first circuit cell does record the specific failure rate corresponding to the input slew value and the output loading value, the cell FIT calculator 4052 directly reads the specific failure rate from the lookup table. If the lookup table corresponding to the first circuit cell does not record the specific failure rate corresponding to the input slew value and the output loading value, the interpolation unit 4050 performs an interpolation to calculate the specific failure rate corresponding to the input slew value and the output loading value. More specifically, the interpolation unit 4050 is arranged to use two input slew values, two output loading values, and two failure rates in the lookup table to interpolate the specific failure rate corresponding to the input slew value and the output loading value. For the example of FIG. 2, if the lookup table 106 corresponding to the first circuit cell does not record the specific failure rate $z\_1.5\_1.5$ corresponding to the input slew value $y\_1.5$ and the output loading value $x\_1.5$, the interpolation unit 4050 may use the input slew values $y\_1$ and $y\_2$, the output loading values $x\_1$ and $x\_2$, and the failure rates $z\_1\_1$ and $z\_2\_2$ in the lookup table 106 to interpolate the specific failure rate $z\_1.5\_1.5$ corresponding to the input slew value $y\_1.5$ and the output loading value $x\_1.5$. When the specific failure rate $z\_1.5\_1.5$ is obtained, the interpolation unit 4050 may pass the specific failure rate $z\_1.5\_1.5$ to the cell FIT calculator 4052.

According to some embodiments, the interpolation unit 4050 and the cell FIT calculator 4052 may calculate the failure rates of all circuit cells $302\_1$~$302\_a$ in the circuit design 300 according to the input slew value and the output loading value loaded from the input unit 4042.

The operating device 406 is coupled to the simulating device 404. The operating device 406 comprises a first operating unit 4062, a second operating unit 4064, and a third operating unit 4066. The operating unit 4062 is arranged to receive the total failure rate of all metal lines and all via structures in the circuit design 300 corresponding to the input slew value and the output loading value. The operating unit 4064 is arranged to receive the total failure rate of all circuit cells $302\_1$~$302\_a$ in the circuit design 300 according to the input slew value and the output loading value. The operating unit 4066 is arranged to generate a total failure rate of the circuit design 300 by adding up the total failure rate of all metal lines and via structures and the total failure rate of all circuit cells $302\_$~$302\_a$ in the circuit design 300.

According to the system 100 in combination with the system 400, the total EM failure rates of the standard cells, the metal lines, the via structures, and the transistors in the circuit design 300 can be obtained. According to some embodiments, the system 100 in combination with the system 400 may also be used for calculating the total TDDB failure rates or the total HCI failure rates of the standard cells, the metal lines, the via structures, and the transistors in the circuit design 300. Moreover, the system 100 is not only used for building up the lookup table of failure rates of a standard circuit cell, the system 100 may also be used for building up the lookup table of failure rates of other functional blocks, such as SRAM circuit, PLL (Phase-lock loop) circuit, or CDR (Clock-data recovery) circuit.

Figure 5:
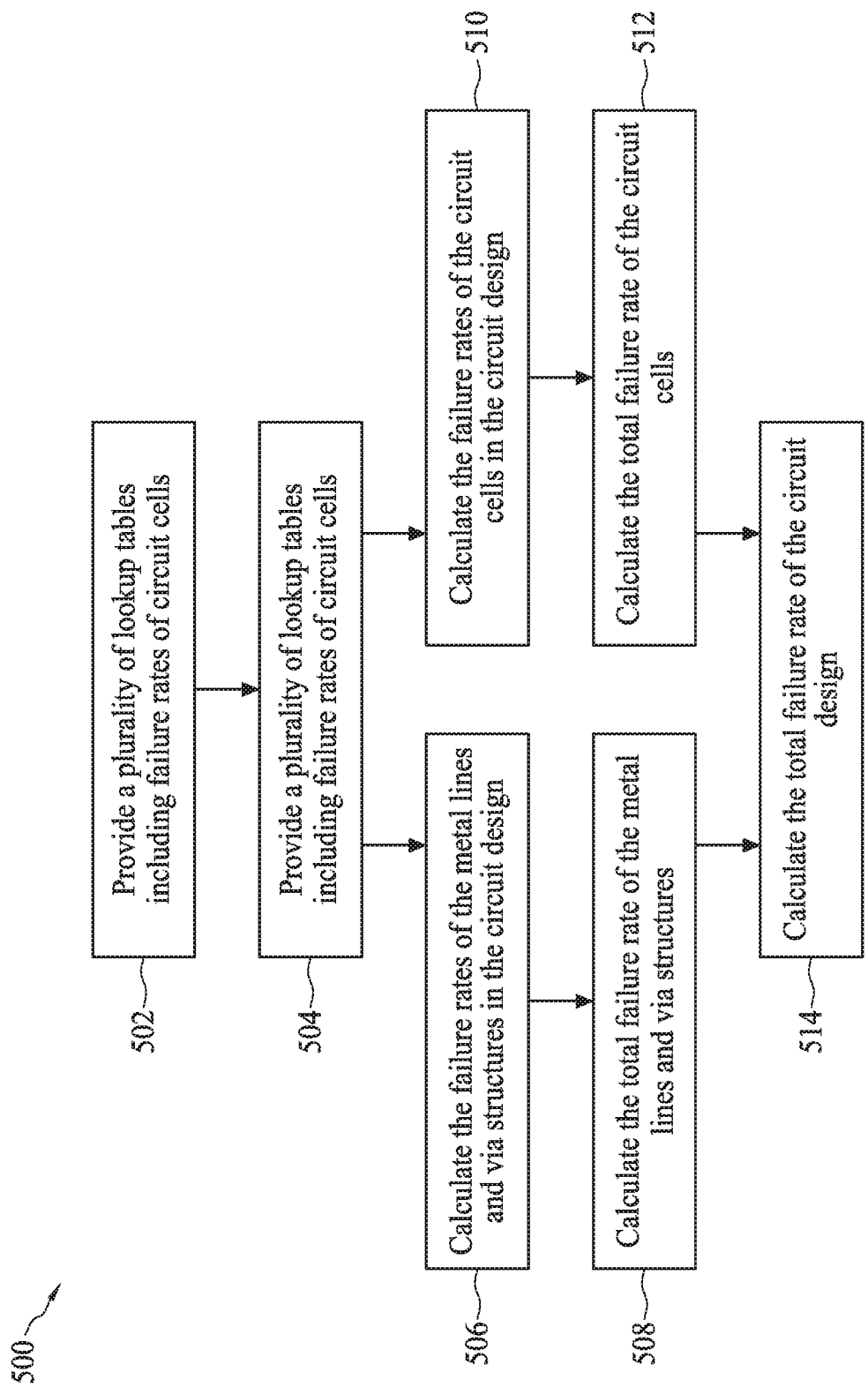
FIG. 5 is a flow chart illustrating a method for simulating reliability of a circuit design of FIG. 3 in accordance with some embodiments.

FIG. 5 is a flow chart illustrating a method 500 for simulating reliability of a circuit design (e.g. 300) in accordance with some embodiments. The method 500 comprises, but is not limited to, operations 502-516. In operation 502, a plurality of lookup tables including a plurality of failure rates of a plurality of circuit cells in the circuit design are provided.

In operation 504, an input slew value and an output loading value are loaded.

In operation 506, the failure rates of the metal lines and via structures in the circuit design corresponding to the input slew value and the output loading value are calculated.

In operation 508, the total failure rate of the metal lines and via structures in the circuit design corresponding to the input slew value and the output loading value is calculated.

In operation 510, the failure rates of the circuit cells in the circuit design corresponding to the input slew value and the output loading value are calculated.

In operation 512, the total failure rate of the circuit cells in the circuit design corresponding to the input slew value and the output loading value is calculated.

In operation 514, the total failure rate of the circuit design corresponding to the input slew value and the output loading value is obtained by adding up the total failure rate of the metal lines and via structures and the total failure rate of the circuit cells in the circuit design.

Figure 6:
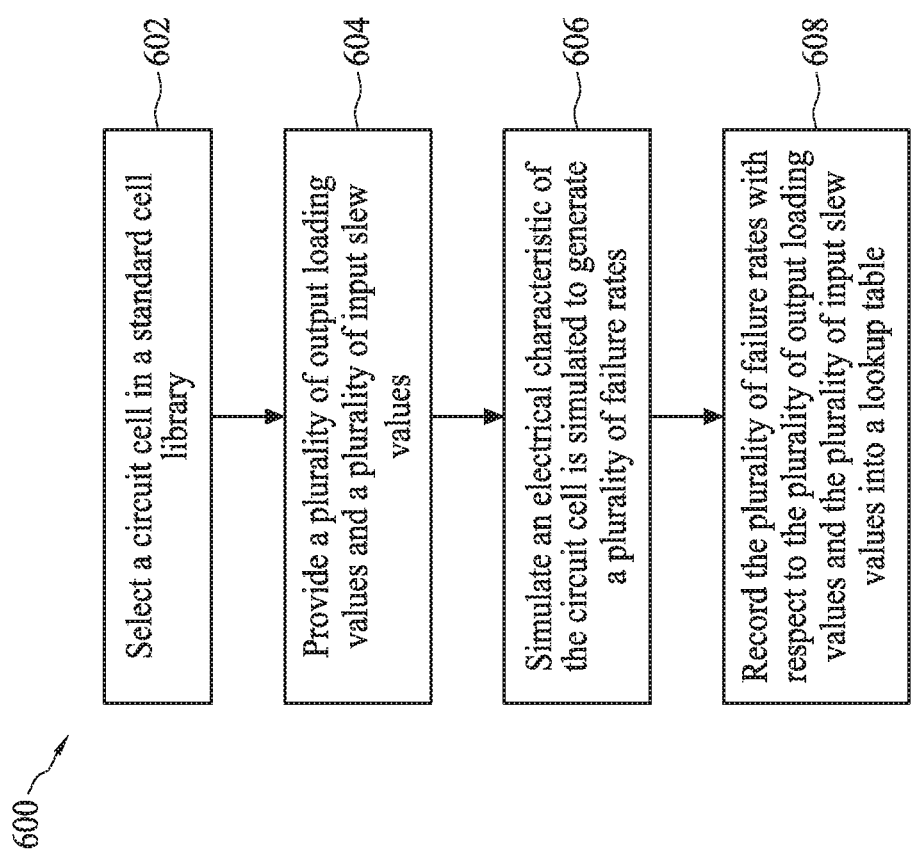
FIG. 6 is a flow chart illustrating a method for simulating reliability of a circuit cell in the circuit design of FIG. 3 in accordance with some embodiments.

In addition, FIG. 6 is a flow chart illustrating a method 600 for simulating reliability of a circuit cell in the circuit design (e.g. 300) in accordance with some embodiments. The method 600 may be an embodiment of the operation 502 in FIG. 5. The method 600 comprises, but is not limited to, operations 602-608. In operation 602, a circuit cell in a standard cell library is selected.

In operation 604, a plurality of output loading values and a plurality of input slew values are provided.

In operation 606, an electrical characteristic of the circuit cell is simulated to generate a plurality of failure rates according to the plurality of output loading values and the plurality of input slew values.

In operation 608, the plurality of failure rates with respect to the plurality of output loading values and the plurality of input slew values are recorded into a lookup table.

According to some embodiments, the operations 602-608 are repeated until all circuit cells in the standard cell library are simulated.

According to the present embodiments, a total failure rate considering all circuit cells in an IP (Intellectual Property) circuit design is obtained, in which the failure rate of each circuit cell in the circuit design is individually evaluated. Accordingly, the present embodiments may not overkill the performance of a circuit cell having relatively low failure rate.

In some embodiments of the present disclosure, a system for simulating reliability of a circuit design is provided. The system comprises a first memory device, a first simulating device, and an operating device. The first memory device is arranged to store a technology file, wherein the circuit design comprises a plurality of circuit cells, and the first memory device further stores a plurality of first failure rates corresponding to a first circuit cell in the plurality of circuit cells. The first simulating device is coupled to the first memory device, for generating a first specific failure rate of the first circuit cell according to the plurality of first failure rates and the technology file. The operating device is coupled to the first simulating device, for generating a total failure rate of the circuit design according to the first specific failure rate.

In some embodiments of the present disclosure, a system for simulating reliability of a circuit cell is provided. The system comprises a memory device, a simulating device, and a lookup table. The memory device is arranged to store a plurality of output loading values and a plurality of input slew values of the circuit cell. The simulating device is coupled to the memory device, for simulating an electrical characteristic of the circuit cell to generate a plurality of failure rates according to the plurality of output loading values and the plurality of input slew values. The lookup table is arranged to record the plurality of failure rates with respect the plurality of output loading values and the plurality of input slew values.

In some embodiments of the present disclosure, a method for simulating reliability of a circuit design is provided. The method comprises: providing a technology file and a plurality of first failure rates corresponding to a first circuit cell in a plurality of circuit cells of the circuit design; generating a first specific failure rate of the first circuit cell according to the plurality of first failure rates and the technology file; and generating a total failure rate of the circuit design according to the first specific failure rate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for simulating reliability of a circuit design, the system comprising:
   a first memory device, arranged to store a technology file and a lookup table, wherein the technology file comprises a first specific value of an input slew parameter of the circuit design and a second specific value of an output loading parameter of the circuit design, wherein the circuit design comprises a plurality of circuit cells, and the lookup table comprises a first input parameter, a second input parameter, and an output parameter for a first circuit cell of the circuit cells,
   the first input parameter comprising: a first input slew value, and
   the second input parameter comprising: a first output loading value and a second output loading value, and
   the output parameter comprising: a first failure rate value and a second failure rate value,
      the first failure rate value corresponding to the first input slew value and the first output loading value,
      the second failure rate value corresponding to the first input slew value and the second output loading value,
   a first simulating device, coupled to the first memory device, for generating a first specific failure rate of the first circuit cell by using the lookup table in a manner in which the input slew parameter serves as the first input parameter so that the first specific value is compared to the first input slew value, and the output loading parameter serves as the second input parameter so that the second specific value is compared to the first output loading value and the second output loading value; and
   an operating device, coupled to the first simulating device, for generating a total failure rate of the circuit design according to the first specific failure rate.

2. The system of claim 1, wherein the first memory device further stores a plurality of second failure rates corresponding to a second circuit cell in the circuit design, the first simulating device is arranged to generate a second specific failure rate of the second circuit cell according to the plurality of second failure rates and the technology file, and the operating device is further arranged to add up the first specific failure rate and the second specific failure rate for generating the total failure rate of the circuit design.

3. The system of claim 1, wherein the technology file comprises an electron-migration file, a time-dependent dielectric breakdown file, or a hot carrier injection file.

4. The system of claim 1, wherein the total failure rate of the circuit design includes a plurality of failure rates of metals or vias in the circuit design and a plurality of specific failure rates of the plurality of circuit cells in the circuit design.

5. The system of claim 1, wherein the first specific failure rate of the first circuit cell is a failure number in a specific number of the first circuit cells through a specific operating time.

6. The system of claim 1,
   wherein the first input parameter comprises a second input slew value,
   wherein the output parameter further comprises a third failure rate value and a fourth failure rate value,
      the third failure rate value corresponding to the second input slew value and the first output loading value, and
      the fourth failure rate value corresponding to the second input slew value and the second output loading value,
   wherein a first simulating device is configured for generating the first specific failure rate by using the lookup table in the manner in which the first specific value is compared to the first input slew value and the second input slew value.

7. The system of claim 6, wherein the first simulating device is arranged to interpolate the first and second output loading values and the first and second input slew values in the lookup table to calculate the first specific failure rate according to the second specific value of the output loading parameter and the first specific value of the input slew parameter in the technology file.

8. The system of claim 6, wherein the first simulating device selects the first specific failure rate among the first failure rate value, the second failure rate value, the third failure rate value, and the fourth failure rate value according to the first specific value and the second specific value.

9. The system of claim 6, further comprising:
   a second memory device, arranged to store the first input slew value and the second input slew value, and the first output loading value and the second output loading value; and
   a second simulating device, coupled to the first memory device, for simulating an electrical characteristic of the first circuit cell to generate the first failure rate value based on the first input slew value and the first output loading value, the second failure rate value based on the first input slew value and the second output loading value, the third failure rate value based on the second input slew value and the first output loading value, and the fourth failure rate value based on the second input slew value and the second output loading value.

10. The system of claim 9, wherein the electrical characteristic is an electron-migration characteristic, a time-dependent dielectric breakdown characteristic, or a hot carrier injection characteristic of the circuit cell.

11. A system for simulating reliability of a circuit cell, the system comprising:

a memory device, arranged to store a first input slew value and a second input slew value of the circuit cell, and a first output loading value and a second output loading value of the circuit cell;

a simulating device, coupled to the memory device, for simulating an electrical characteristic of the circuit cell to generate a first failure rate value based on the first input slew value and the first output loading value, a second failure rate value based on the first input slew value and the second output loading value, a third failure rate value based on the second input slew value and the first output loading value, and a fourth failure rate value based on the second input slew value and the second output loading value; and a lookup table, arranged to record the first input slew value and the second input slew value as values of a first input parameter of the lookup table, the first output loading value and the second output loading value as values of a second input parameter of the lookup table, and the first failure rate value, the second failure rate value, the third failure rate value, and the fourth failure rate value as values of an output parameter of the lookup table.

12. The system of claim 11, wherein the electrical characteristic is an electron-migration characteristic, a time-dependent dielectric breakdown characteristic, or a hot carrier injection characteristic of the circuit cell.

13. A method for simulating reliability of a circuit design, the method comprising:

providing a technology file and a lookup table, wherein the technology file comprises a first specific value of an input slew parameter of the circuit design and a second specific value of an output loading parameter of the circuit design, wherein the circuit design comprises a plurality of circuit cells, and the lookup table comprises a first input parameter, a second input parameter, and an output parameter for a first circuit cell of the circuit cells, the first input parameter comprising: a first input slew value, and the second input parameter comprising: a first output loading value and a second output loading value, and the output parameter comprising: a first failure rate value and a second failure rate value, the first failure rate value corresponding to the first input slew value and the first output loading value, the second failure rate value corresponding to the first input slew value and the second output loading value, generating a first specific failure rate of the first circuit cell by using the lookup table in a manner in which the input slew parameter serves as the first input parameter so that the first specific value is compared to the first input slew value, and the output loading parameter serves as the second input parameter so that the second specific value is compared to the first output loading value and the second output loading value; and generating a total failure rate of the circuit design according to the first specific failure rate.

14. The method of claim 13, further comprising:
providing a plurality of first failure rates corresponding to a second circuit cell in the plurality of circuit cells of the circuit design;

generating a second specific failure rate of the second circuit cell according to the plurality of second failure rates and the technology file; and adding up the first specific failure rate and the second specific failure rate for generating the total failure rate of the circuit design.

15. The method of claim 13, wherein the technology file comprises an electron-migration file, a time-dependent dielectric breakdown file, or a hot carrier injection file.

16. The method of claim 13, wherein the total failure rate of the circuit design includes a plurality of failure rates of metals or vias in the circuit design and a plurality of specific failure rates of the plurality of circuit cells in the circuit design.

17. The method of claim 13,
wherein the first input parameter comprises a second input slew value, wherein the output parameter further comprises a third failure rate value and a fourth failure rate value,
the third failure rate value corresponding to the second input slew value and the first output loading value, and
the fourth failure rate value corresponding to the second input slew value and the second output loading value, wherein the first simulating device is configured for generating the first specific failure rate by using the lookup table in the manner in which the first specific value is compared to the first input slew value and the second input slew value.

18. The method of claim 17, wherein the step of generating the first specific failure rate of the first circuit cell by using the lookup table further comprises:

interpolating the first and second output loading values and the first and second input slew values in the lookup table to calculate the first specific failure rate according to the second specific value of the output loading parameter and the first specific value of the input slew parameter in the technology file.

19. The method of claim 17, wherein the step of generating the first specific failure rate of the first circuit cell by using the lookup table further comprises:

selecting the first specific failure rate among the first failure rate value, the second failure rate value, the third failure rate value, and the fourth failure rate value according to the first specific value and the second specific value.

20. The method of claim 17, further comprising:
providing the first input slew value and the second input slew value, and the first output loading value and the second output loading value;

simulating an electrical characteristic of the first circuit cell to generate the first failure rate value based on the first input slew value and the first output loading value, the second failure rate value based on the first input slew value and the second output loading value, the third failure rate value based on the second input slew value and the first output loading value, and the fourth failure rate value based on the second input slew value and the second output loading value; and recording the first input slew value and the second input slew value as values of the first input parameter of the lookup table, the first output loading value and the second output loading value as values of the second input parameter of the lookup table, and the first failure rate value, the second failure rate value, the third failure rate value, and the fourth failure rate value as values of the output parameter of the lookup table.

* * * * *